(12) United States Patent
Chan et al.

(10) Patent No.: US 10,192,287 B2
(45) Date of Patent: Jan. 29, 2019

(54) IMAGE PROCESSING METHOD AND IMAGE SYSTEM FOR TRANSPORTATION

(71) Applicant: INDUSTRIAL TECHNOLOGY RESEARCH INSTITUTE, Hsinchu (TW)

(72) Inventors: Sheng-Wei Chan, Taipei (TW); Che-Tsung Lin, Hsinchu (TW)

(73) Assignee: INDUSTRIAL TECHNOLOGY RESEARCH INSTITUTE, Chutung, Hsinchu (TW)

( * ) Notice: Subject to any disclaimer, the term of this patent is extended or adjusted under 35 U.S.C. 154(b) by 4 days.

(21) Appl. No.: 15/388,124

(22) Filed: Dec. 22, 2016

(65) Prior Publication Data

US 2018/0150939 A1 May 31, 2018

(30) Foreign Application Priority Data

Nov. 29, 2016 (TW) .............................. 105139290 A

(51) Int. Cl.
*G06T 3/40* (2006.01)
*G06K 9/22* (2006.01)
(Continued)

(52) U.S. Cl.
CPC ........ *G06T 3/4038* (2013.01); *G06K 9/00523* (2013.01); *G06K 9/00791* (2013.01);
(Continued)

(58) Field of Classification Search
CPC .............. G06T 3/4038; G06K 9/00523; G06K 9/00798; G06K 9/224
See application file for complete search history.

(56) References Cited

U.S. PATENT DOCUMENTS 5,289,321 A 2/1994 Secor
7,859,565 B2 12/2010 Schofield et al.
(Continued)

FOREIGN PATENT DOCUMENTS

CN 102474596 A 5/2012
CN 104302516 A 1/2015
(Continued)

OTHER PUBLICATIONS

Kukelova et al, "Radial Distortion Homography," 2015, Computer Vision and Pattern Recognition (CVPR), 2015 IEEE Conference on, pp. 639-647.*
(Continued)

*Primary Examiner* — David F Dunphy
(74) *Attorney, Agent, or Firm* — Muncy, Geissler, Olds & Lowe, P.C.

(57) ABSTRACT

An image processing method is adapted to process images captured by at least two cameras in an image system. In an embodiment, the image processing method comprises: matching two corresponding feature points for two images, respectively, to become a feature point set; selecting at least five most suitable feature point sets, by using an iterative algorithm; calculating a most suitable radial distortion homography between the two images, according to the at least five most suitable feature point sets; and fusing the images captured by the at least two cameras at each of timing sequences, by using the most suitable radial distortion homography.

7 Claims, 6 Drawing Sheets

(51) Int. Cl.
*G06K 9/00* (2006.01)
*G06K 9/46* (2006.01)
*G06K 9/62* (2006.01)
*G06K 9/20* (2006.01)
*G06K 9/36* (2006.01)

(52) U.S. Cl.
CPC ......... *G06K 9/00798* (2013.01); *G06K 9/224* (2013.01); *G06K 9/4671* (2013.01); *G06K 9/6211* (2013.01); *G06K 9/6228* (2013.01); *G06K 2009/2045* (2013.01); *G06K 2009/363* (2013.01)

(56) References Cited

U.S. PATENT DOCUMENTS

| | | | |
|---|---|---|---|
| 8,098,142 | B2 | 1/2012 | Schofield et al. |
| 8,587,661 | B2 | 11/2013 | McCubbrey |
| 9,311,818 | B2 | 4/2016 | Lin et al. |
| 2003/0090568 | A1 | 5/2003 | Pico |
| 2003/0133014 | A1 | 7/2003 | Mendoza |
| 2012/0148164 | A1* | 6/2012 | Suk .......................... G06K 9/46 382/201 |
| 2013/0229519 | A1 | 9/2013 | Kavuru |
| 2014/0341434 | A1* | 11/2014 | Lin ........................ G08G 1/166 382/104 |
| 2015/0254818 | A1 | 9/2015 | Li et al. |
| 2017/0341583 | A1* | 11/2017 | Zhang ....................... G06T 7/73 |

FOREIGN PATENT DOCUMENTS

| | | |
|---|---|---|
| CN | 105335932 A | 2/2016 |
| TW | 201403545 A | 1/2014 |
| TW | 201424382 A | 6/2014 |
| TW | I476730 B | 3/2015 |
| TW | I545936 B | 8/2016 |
| TW | I554976 B | 10/2016 |
| TW | I576652 B | 4/2017 |

OTHER PUBLICATIONS

Chau, H., et al., "Robust Panoramic Image Stitching," Stanford University, Final Report on Lecture C8231A: Computer Vision, From 3D Reconstruction to Recognition, winter term 2013/14, Status as of Mar. 24, 2016, 6 pp., http://web.stanford.edu/class/ca231a/ prev_projects 2015/Chau Karol_CS231a_Final Paper.pdf [searched on Nov. 16, 2017], Stanford, CA, US.

Kanwal, N., et al., "Are Performance Differences of Interest Operators Statistically Significant?," Computer Analysis of Images and Patterns, 14th International Conference Proceedings, Part 2, Seville, Spain, LNCS 6855, Aug. 2011, pp. 429-436, Springer-Verlag Berlin / Heidelberg, DE.

Szelski, R., "Image Alignment and Stitching: A Tutorial," Technical Report MSR-TR-2004-92, Microsoft Research, Microsoft Corporation, Dec. 10, 2006, pp. 56-63, Redmond, WA, US.

Shutao Li, et al., "Fusing Images With Different Focuses Using Support Vector Machines"; IEEE Transaction on Neural Networks; vol. 15, No. 6, Nov. 2004; 7 pgs.

Wei Wang, et al.; "A Variational Method for Multiple-Image Blending"; IEEE Transactions on Image Processing; vol. 21, No. 4; Apr. 2012; 14 pgs.

Joon Shik Yoon, et al.; "Regularized Image Sequence Interpolation by Fusing Low-Resolution Frames"; 1999 IEEE Tencon; pp. 1271-1274.

Cedric Allene, et al.; "Seamless Image-Based Texture Atlases Using Multi-Band Blending"; Dec. 2008; 4 pgs.

Yingen Xiong, et al.; "Sequential Image Stitching For Mobile Panoramas"; 2009 IEEE; ICICS 2009; 5 pgs.

Hiroyuki Uchiyama, et al.; "Removal of Moving Objects From a Street-View Image by Fusing Multiple Image Sequences"; Aug. 2010; 4 pgs.

* cited by examiner

IMAGE PROCESSING METHOD AND IMAGE SYSTEM FOR TRANSPORTATION

CROSS REFERENCE TO RELATED APPLICATION

This application claims the priority benefits of Taiwan Patent Application No. 105139290, filed on Nov. 29, 2016. The entirety of which is incorporated by reference herein.

TECHNICAL FIELD

The disclosure relates to an image processing method and an image system for transportation.

BACKGROUND

As people are increasingly affluent today, motor vehicles (such as cars and electric vehicles) are becoming increasingly popular. In addition to continuous improvement in the vehicle power, requirements in the vehicle safety are also increased. In general, drivers identify other objects behind the vehicle by using rear-view mirrors. However, the drivers cannot see through pillars between front and rear doors (B-pillars), pillars between rear doors and rear windshields (C-pillars), rear trunks, and vehicle body itself, which cause blind zones or blind spots. This may interfere driving safety. To improve traffic safety and avoid traffic hazards, there are vehicle rear-side monitoring systems installed in vehicles in the market. For example, a vehicle rear-side monitoring system is usually installed at the back of the vehicle or inside the vehicle. The vehicle rear-side monitoring system captures rear images and displays rear images on screens. This alerts the drivers to keep a safe distance from other vehicles or obstacles. However, viewing angles of the vehicle rear-side monitoring system differ from viewing angles of the driver. There are blind zones or blind spots caused by the B/C pillars, the rear trunks, and the vehicle body. This may cause vehicle collisions because the drivers incorrectly estimate rear distances. Therefore, the existing vehicle rear-side monitoring system needs to be improved.

SUMMARY

The present disclosure provides an image processing method for transportation. The image processing method is adapted to process images captured by at least two cameras in an image system. The image processing method comprises: matching two corresponding feature points for two images, respectively, to become a feature point set; selecting at least five most suitable feature point sets, by using an iterative algorithm; calculating a most suitable radial distortion homography between the two images, according to the at least five most suitable feature point sets; and fusing the images captured by the at least two cameras at each of timing sequences, by using the most suitable radial distortion homography.

The present disclosure provides an image system for transportation. The image system comprises: at least two cameras configured to capture images; a processor coupled to the at least two cameras, wherein the processor is configured to eliminate distortions of the at least two cameras so as to obtain fused images without distortions; and a monitor coupled to the processor, wherein the monitor is configured to display the fused images without distortions.

DETAILED DESCRIPTION OF DISCLOSED EMBODIMENTS

The present disclosure solves problems of blind zones seen from rear-view mirrors by drivers. The present disclosure also solves problems of viewing angle differences between vehicle rear-side monitoring systems and drivers. The blind zones or viewing angle differences result that the drivers cannot be effectively assisted to observe rear road conditions or to avoid collisions of vehicles or pedestrians. More specifically, the present disclosure removes blind zones or spots caused by B/C pillars, rear trunks, or vehicle body itself in rear-view minors so as to avoid traffic safety problems. The present disclosure provides an image processing method and its image system for stitching and fusing distorted images, which eliminates image distortions at the same time. By using radial distortion homographies, image distortion between different cameras may be eliminated. The images from different cameras are well coincided to each other. Therefore, the present disclosure is able to eliminate blind zones and generate a perspective view of rear half of vehicle body.

Figure 1:
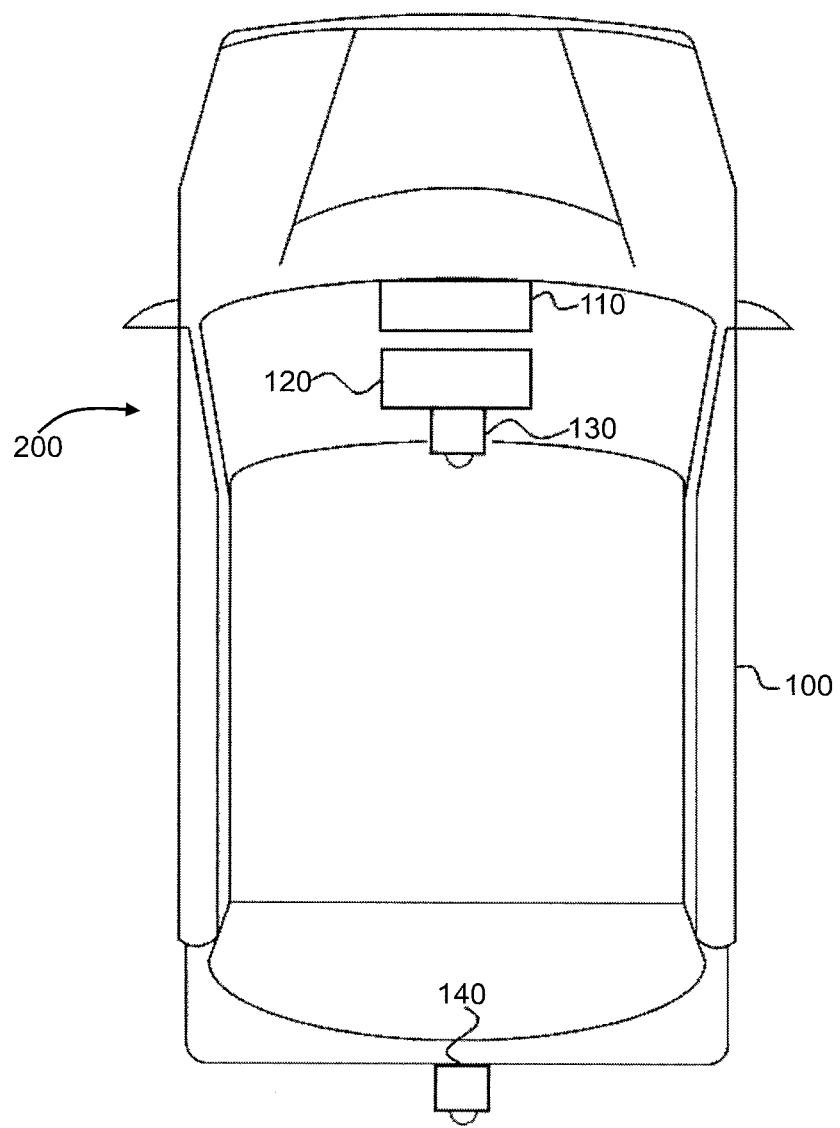
FIG. 1 is a diagram illustrating an image system for transportation in accordance with an embodiment of the present disclosure.

FIG. 1 is a diagram illustrating an image system for transportation in accordance with an embodiment of the present disclosure. An image system 200 for transportation is equipped on a vehicle 100. The image system 200 comprises a monitor 110, a processor 120, a camera 130, and a camera 140. The monitor 110 is located on line-of-sight coverage of drivers, for example, the monitor 110 is located on a position of a rear-view mirror between a driver seat and a shotgun seat. In an embodiment, the monitor 110 is located on a position of a central controlling board. The monitor 110 may be any of suitable screens such as liquid-crystal displays (LCD) or organic light-emitting diode (OLED), and so on. The monitor 110 is configured to display processed rear images.

The camera 130 is located inside the vehicle 100. More specifically, the camera 130 is located above and between a driver seat and a shotgun seat. A camera lens of the camera 130 faces the rear of the vehicle 100. The camera 140 is located on the back of the vehicle 100. A camera lens of the camera 140 also faces the rear of the vehicle 100. The camera 130 and the camera 140 are configured to capture images. The camera 130 and the camera 140 may be any of suitable image sensors such as charge-coupled device (CCD), complementary metal-oxide-semiconductor (CMOS) image sensors, or infrared image capture devices, and so on. In an embodiment, the camera 130 and the camera 140 are the same type of image sensors. In an embodiment, the camera 130 and the camera 140 are any of aforesaid two types of image sensors.

The processor 120 is coupled to the camera 130, the camera 140, and the monitor 110. Images captured by the camera 130 and the camera 140 are transmitted to the processor 120. The processor 120 is configured to eliminate image distortions of border areas or wide-angle edges of the camera 130 and the camera 140. After fusing images of the camera 130 and the camera 140, there are no image distortions at image stitching regions. The processor 120 generates fused images without distortions. The processor 120 also generates perspective views of rear half of a vehicle body, which eliminate blind zones of drivers. The processor 120 may be programmable integrated circuits such as microcontroller units or field programmable gate arrays (FPGA). Those circuits may be designed by hardware description language (HDL).

Figure 2:
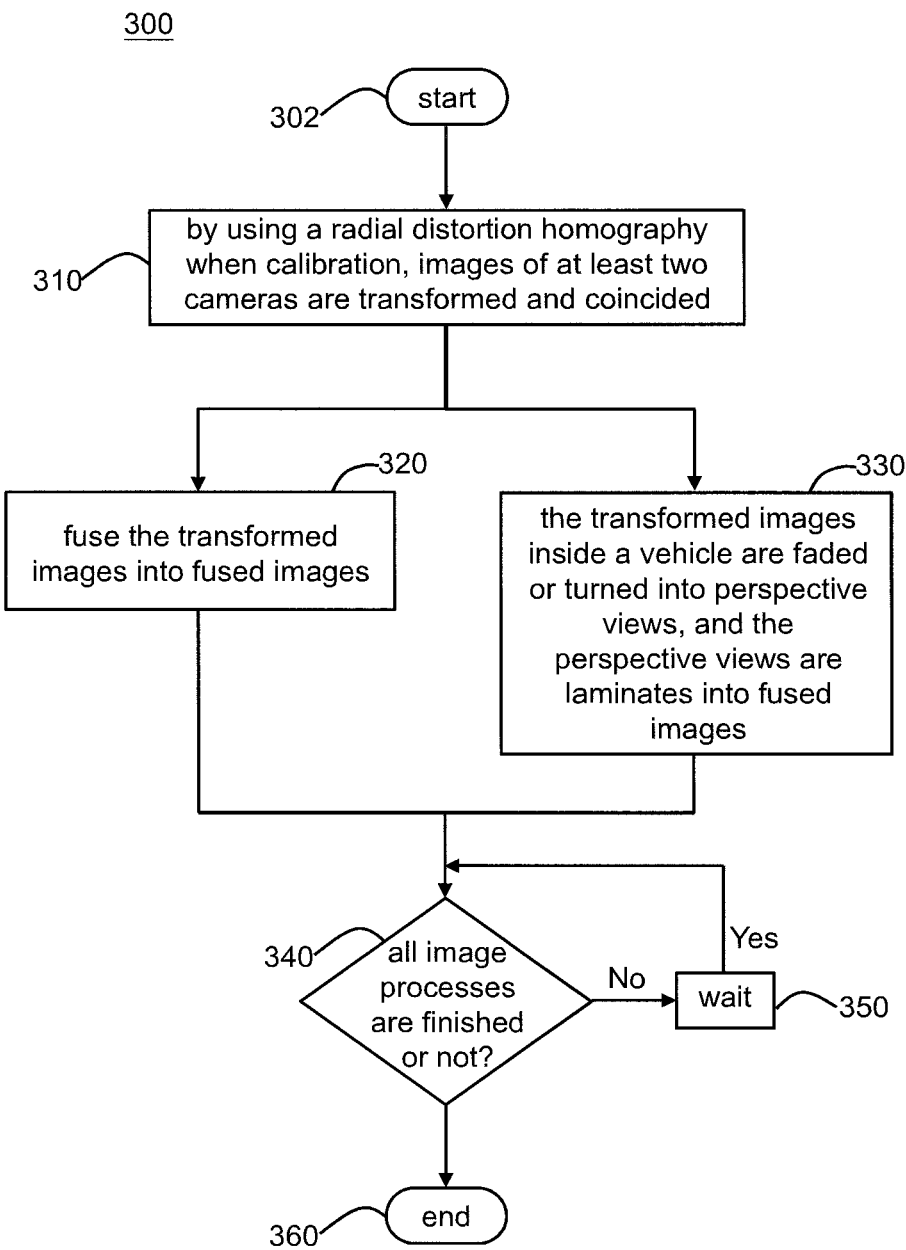
FIG. 2 is a flowchart illustrating an image processing method for transportation in accordance with an embodiment of the present disclosure.

FIG. 2 is a flowchart illustrating an image processing method 300 for transportation in accordance with an embodiment of the present disclosure. Steps in FIG. 2 refers to signal processing in the processor 120. In a step 302, the processor 120 begins to process image signals. The processor 120 receives image signals came from the camera 130 and the camera 140.

In a step 310, the processor 120 utilizes a radial distortion homography to transform images captured by the camera 130 and the camera 140. The radial distortion homography is obtained when calibration. By using the radial distortion homography, the images of the camera 130 and the camera 140 are fused and well coincided. Derivation of the radial distortion homography will be described as follows. Assuming that the images of the camera 130 and the camera 140 are simply laminated without utilizing the radial distortion homography, there are image distortions at border areas or wide-angle edges. The reason is that the camera 130 and the camera 140 have wide-angle lenses, which cause broader viewing angles. There are image distortion regions at borders of images of the camera 130 and the camera 140. For example, there are barrel distortions or pincushion distortions at borders of the images. If the image distortion regions are neglected and then stitched, image aberrations of laminated images becomes serious. In an embodiment, by using a most suitable radial distortion homography, the processor 120 is configured to eliminate distortions at border areas or wide-angle edges of images captured by the camera 130 and the camera 140. There are no image distortions at image stitching regions. The images of the camera 130 and the camera 140 at each of timing sequences are well fused or coincided so as to obtain fused images without distortions.

In a step 320, the processor 120 is configured to fuse transformed images into fused images. The transformed images are referred to as images captured by the camera 130 and the camera 140 and further transformed by the most suitable radial distortion homography. By using the most suitable radial distortion homography, the processor 120 respectively transforms the captured images by the camera 130 and the camera 140 at each of timing sequences. Further, the processor 120 fuses transformed images of the camera 130 and the camera 140 into fused images at each of the timing sequences.

In a step 330, after the processor 120 makes transformed images inside the vehicle 100 into perspective views, the processor 120 fuses the perspective views into fused images. The transformed images are referred to as images captured by the camera 130 and the camera 140 and further transformed by the most suitable radial distortion homography. In field of viewing angles of the camera 130, the camera 130 captures images inside the vehicle 100 and the rear vehicle body. The images inside the vehicle 100 may comprise rear seats, rear trunks, B/C pillars, and rear half of the vehicle body. In other words, the processor 120 is configured to adjust image weights of the camera 130 and the camera 140. For example, the processor 120 decreases an image weight of the camera 130. This results that the images inside the vehicle 100 are faded or made into transparent or diluted views. A formula for adjusting image weights is shown as follows.

$$P_{total}=P_{inside}*W_{inside}+P_{outside}*W_{outside}; W_{inside}+W_{outside}=1$$

$P_{total}$ represents a summation of pixel values. $P_{inside}$ represents pixel values corresponding to images inside the vehicle 100. $W_{inside}$ represents image weights of pixels corresponding to images inside the vehicle 100. $P_{outside}$ represents pixel values corresponding to images outside the vehicle 100. $W_{outside}$ represents image weights of pixels corresponding to images outside the vehicle 100. In an embodiment, a value of the $W_{inside}$ is 0.5. A value of the $W_{outside}$ is 0.5. In another embodiment, a value of the $W_{inside}$ is 0.1. A value of the $W_{outside}$ is 0.9, wherein the images inside the vehicle 100 become more transparent.

In a step 340, the processor 120 finishes all image processes. If some image processes are not finished, the procedure of the image processing method 300 goes to a step 350, which waits for the processor 120 to calculate all image data. If all image processes are finished, the procedure of the image processing method 300 goes to a step 360. The processor 120 ends up the procedure of the image processing method 300.

Figure 3:
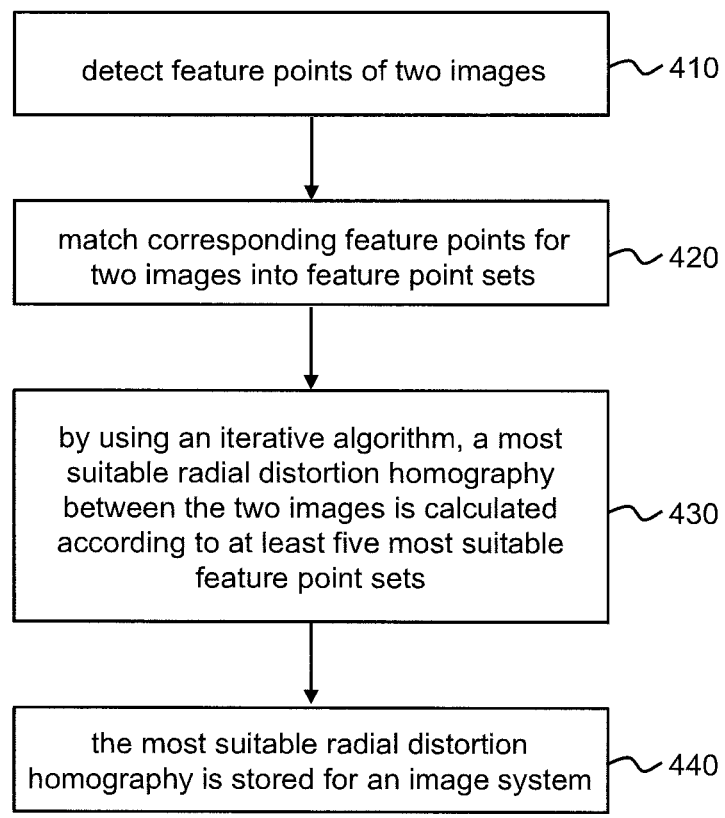
FIG. 3 is a flowchart illustrating sub-steps of a step in the image processing method in accordance with an embodiment of the present disclosure.

FIG. 3 is a flowchart illustrating the step 310 of the image processing method 300 in accordance with an embodiment of the present disclosure. FIG. 3 illustrates the detailed of the step 310. The step 310 further comprises steps 410, 420, 430, and 440. As a whole in the step 310, the processor 120 utilizes a most suitable radial distortion homography obtained during calibration to transform images captured by the camera 130 and the camera 140. The images are then fused and coincided. Before the image system 200 normally operates, the image system 200 needs to be calibrated in advance. The step 310 may be classified as a calibration procedure, wherein the sub-steps are also classified as calibration procedures. The sub-steps are described as follows.

In a step 410, the processor 120 detects a plurality of feature points of two images of the camera 130 and the camera 140. The two images are referred to as images respectively captured by the camera 130 and the camera 140 at the same time. A detection method of feature points may be any of suitable methods such as scale-invariant feature transforms (SIFT), speeded up robust features (SURF), and so on. By using SIFT or SURF, robust-invariant-feature points are captured from the two images of the camera 130 and the camera 140. In an embodiment, main steps of the SIFT method comprises: (A) scale-space extreme detection; (B) optimization for positions of feature points; (C) calculation for directionality of feature points; and (D) description for feature points. By using the SIFT, unique key points may be identified, wherein the key points are not affected by external factors such as movements, rotations, scaling, affine transformations, and brightness. In an embodiment, concepts and steps of the SURF method are based on the SIFT, but some detailed steps are different. The SURF method mainly comprises following three steps: (A) detection for feature points; (B) description for feature proximity; and (C) matching for descriptors. The SURF method utilizes determinant values of the Hessian matrix for feature-point detection and accelerates operations by using integral graphs. The descriptors of the SURF method are based on 2-dimensional discrete wavelet transform (DWT) responses and effectively utilizes the integral graphs. In an embodiment of the step 410, a checkerboard or a calibration background with rich texture may be placed in line-of-sight coverage of the camera 130 and the camera 140. Meanwhile, the calibration backgrounds have scales so that foreground objects in images captured by the camera 130 and the camera 140 may be observed.

In a step 420, the processor 120 matches corresponding feature points for two images of the camera 130 and the camera 140, respectively, to become a feature point set. By using matching methods to match a plurality of feature points of the two images, corresponding feature points of the two images are defined. The matching methods may be suitable methods such as usage of Euclidean distance. By using the Euclidean distance, the distances between feature points are used to determine whether they are corresponding feature points or not.

In a step 430, by using an iterative algorithm (such as random sample consensus, RANSAC), the processor 120 selects at least five most suitable feature point sets for every iteration. Further, the processor 120 calculates a most suitable or a best radial distortion homography between the two images, according to the at least five most suitable feature point sets. The processor 120 calculates distortion parameters of an optimal solution. In an embodiment, the iterative algorithm could be random sample consensus (RANSAC). Steps of the RANSAC comprise: (A) several feature points are randomly selected from data and the selected several feature points are set as an inner group; (B) a suitable model for the inner group is calculated and established; (C) other unselected feature points are substituted into the established models to calculate whether the unselected feature points are the inner group or not; (D) the number of feature points in the inner group is recorded; (E) the above steps are repeated; and (F) a plurality of numbers of feature points among a plurality of inner groups are compared, and of which an inner group having a largest number of feature points is selected, wherein the model calculated and established for the selected inner group is an optimal solution.

In a step 440, after calculation of iterative algorithm, the processor 120 stores the most suitable or the best radial distortion homography. Calibration for the image system 200 and procedures for calculating the radial distortion homography are finished. The stored radial distortion homography is ready for use when the image system 200 operates.

Figure 4:
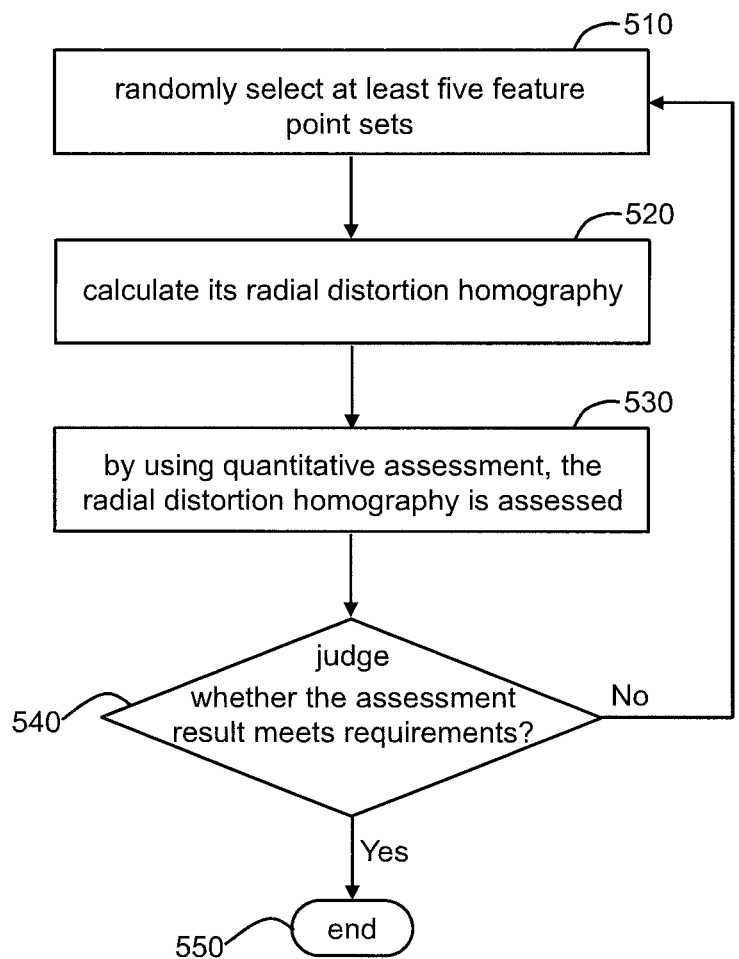
FIG. 4 is a flowchart illustrating sub-steps of another step in the image processing method in accordance with an embodiment of the present disclosure.

FIG. 4 is a flowchart illustrating the step 430 of the image processing method 300 in accordance with an embodiment of the present disclosure. The step 430 comprises sub-steps 510, 520, 530, 540, and 550. As a whole in the step 430, by using an iterative algorithm, the processor 120 selects at least five most suitable feature point sets for every iteration. Further, the processor 120 calculates a most suitable radial distortion homography between the two images, according to the at least five most suitable feature point sets. The sub-steps of the step 430 are described as follows.

In the sub-step 510, the processor 120 randomly selects k sets of feature point sets ($\hat{x}_i, \hat{x}_i'$) from a plurality of feature point sets of the two images. The value of k is greater than 5, and i=0, 1, 2, ..., k. The feature point sets ($\hat{x}_i, \hat{x}_i'$) also represent two undistorted feature points in two images, respectively. For example, a label $\hat{x}_i$ represents an undistorted feature point in the image of the camera 130. The label $\hat{x}_i$ also represents an undistorted coordinate shown as $\hat{x}_i = [\hat{x}_i, \hat{y}_i, 1]^t$. The labels $\hat{x}_i$ and $\hat{y}_i$ represent coordinate positions. A label t represents transpose of a matrix. A label $\hat{x}_i'$ represents an undistorted feature point in the image of the camera 140. The label $\hat{x}_i'$ also represents an undistorted coordinate shown as $\hat{x}_i' = [\hat{x}_i', \hat{y}_i', 1]^t$. The labels $\hat{x}_i'$ and $\hat{y}_i'$ represent coordinate positions. A label t represents transpose of a matrix.

In the sub-step 520, the processor 120 calculates its radial distortion homography according to the k sets of feature point sets ($\hat{x}_i, \hat{x}_i'$), which are randomly chosen. Specifically, the processor 120 selects k sets of feature point sets ($\hat{x}_i, \hat{x}_i'$) or at least five feature point sets for every iteration. Those selected feature point sets are repeatedly substituted into a relation formula between the feature point sets and radial distortion homographies. A plurality of radial distortion homographies H are calculated by using the iterative algorithm. The relation formula between the feature point sets and radial distortion homographies is shown as follows.

$$f_u(\hat{x}_i', \lambda') = Hf_u(\hat{x}_i, \lambda) \rightarrow [f_u(\hat{x}_i', \lambda')]_x Hf_u(\hat{x}_i, \lambda) = 0$$

A label $[f_u(\hat{x}_i', \lambda')]_x$ represents a skew symmetric matrix. A label H represents radial distortion homographies. Later the relation formula is expanded below.

$$\rightarrow \begin{bmatrix} 0 & -\hat{w}_i' & \hat{y}_i' \\ \hat{w}_i' & 0 & -\hat{x}_i' \\ -\hat{y}_i' & \hat{x}_i' & 0 \end{bmatrix} \begin{bmatrix} h_{11} & h_{12} & h_{13} \\ h_{21} & h_{22} & h_{23} \\ h_{31} & h_{32} & h_{33} \end{bmatrix} \begin{bmatrix} \hat{x}_i \\ \hat{y}_i \\ \hat{w}_i \end{bmatrix} = 0$$

Parameters in the relation formula have following relations.

$$\hat{w}_i = 1 + \lambda(\hat{x}_i^2 + \hat{y}_i^2), \quad \hat{w}_i' = 1 + \lambda'(\hat{x}_i'^2 + \hat{y}_i'^2)$$

$$f_u(\hat{x}_i, \lambda) = [\hat{x}_i, \hat{y}_i, \hat{w}_i]^t = [\hat{x}_i, \hat{y}_i, 1 + \lambda(\hat{x}_i^2 + \hat{y}_i^2)]^t$$

$$f_u(\hat{x}_i', \lambda') = [\hat{x}_i', \hat{y}_i', \hat{w}_i']^t = [\hat{x}_i', \hat{y}_i', 1 + \lambda'(\hat{x}_i'^2 + \hat{y}_i'^2)]^t$$

By using the relation formula between the feature point sets and radial distortion homographies H, radial distortion homographies H between two images are calculated. That is, values of the elements $h_{11}$, $h_{12}$, $h_{13}$, $h_{21}$, $h_{22}$, $h_{23}$, $h_{31}$, $h_{32}$, and $h_{33}$ of H are calculated and obtained. Meanwhile, distortion parameters $\lambda$ and $\lambda'$ between two images are calculated and obtained.

In the sub-step 530, by using a quantitative assessment, the processor 120 quantizes effects of radial distortion homographies H and distortion parameters $\lambda$ and $\lambda'$ between two images. In other words, the processor 120 quantitative assesses the plurality of radial distortion homographies H and distortion parameters $\lambda$ and $\lambda'$. First, the processor 120 defines or marks ground truth point sets (GT_ptS) between two images. The ground truth point sets may be processed automatically or marked by users. The ground truth point sets clearly indicates the position relationship between a location of each point or pixel in an image and a corresponding coordinate appeared in another image. For every iteration, after one radial distortion homography H is estimated and obtained, the processor 120 transforms the ground truth point sets (GT_ptS), respectively, into transfer point sets (T_ptS) according to the radial distortion homography H. The processor 120 calculates the distance difference values between the transfer point sets and the ground truth point sets. Later, the processor 120 sums up distance difference values and brings out an average value of the distance difference values. Thus, the average value of the distance difference values for the used radial distortion homography H is obtained. In an embodiment, when a distance difference value for an iteration falls within a predetermined range or is less than a limit value, the iteration will stop. The used radial distortion homography H will be stored and regarded as a most suitable radial distortion homography H. In an embodiment, after a total number of iterations are performed, the iteration for the step 430 is stopped. A most suitable radial distortion homography H will be chosen and stored.

In the sub-step 540, the processor 120 judges whether the assessment result meets requirements or not. If the requirement are not met, k sets of feature point sets ($\widetilde{x}_i, \widetilde{x}_i'$) are reselected and substituted into the relation formula aforementioned. A new iteration for the assessment will be performed. If yes, the procedure goes to the sub-step 550. In the sub-step 550, the iterative calculations of radial distortion homographies H and distortion parameters λ and λ' between two images are accomplished. After the above steps 510-550 (equivalent to completion of step 430), the processor 120 carries out a most suitable or a best radial distortion homography H and its distortion parameters λ and λ' by using an iterative algorithm. Referring back to the step 440 (FIG. 3), the processor 120 stores the most suitable or the best radial distortion homography H and the distortion parameters λ and λ', which will be used in the step 320. Referring back to the step 320 (FIG. 2), by using the most suitable radial distortion homography H, the processor 120 respectively transforms images of the camera 130 and the camera 140 at each of timing sequences. Further, the processor 120 fuses transformed images of the camera 130 and the camera 140 into fused images at each of the timing sequences. After the above steps, the processor 120 is able to eliminate distortions at border areas or wide-angle edges of images of the camera 130 and the camera 140. There are no image distortions at image stitching regions. The images of the camera 130 and the camera 140 at each of timing sequences are well fused or coincided so as to obtain fused images without distortions.

In an embodiment adapted to the transportation, the image system 200 comprises at least two cameras (the camera 130 and camera 140) configured to capture images; a processor 120 coupled to the at least two cameras (the camera 130 and camera 140), wherein the processor 120 is configured to eliminate distortions of the at least two cameras (the camera 130 and camera 140) so as to obtain fused images without distortions; and a monitor 110 coupled to the processor 120, wherein the monitor 110 is configured to display the fused images without distortions.

Figure 5:
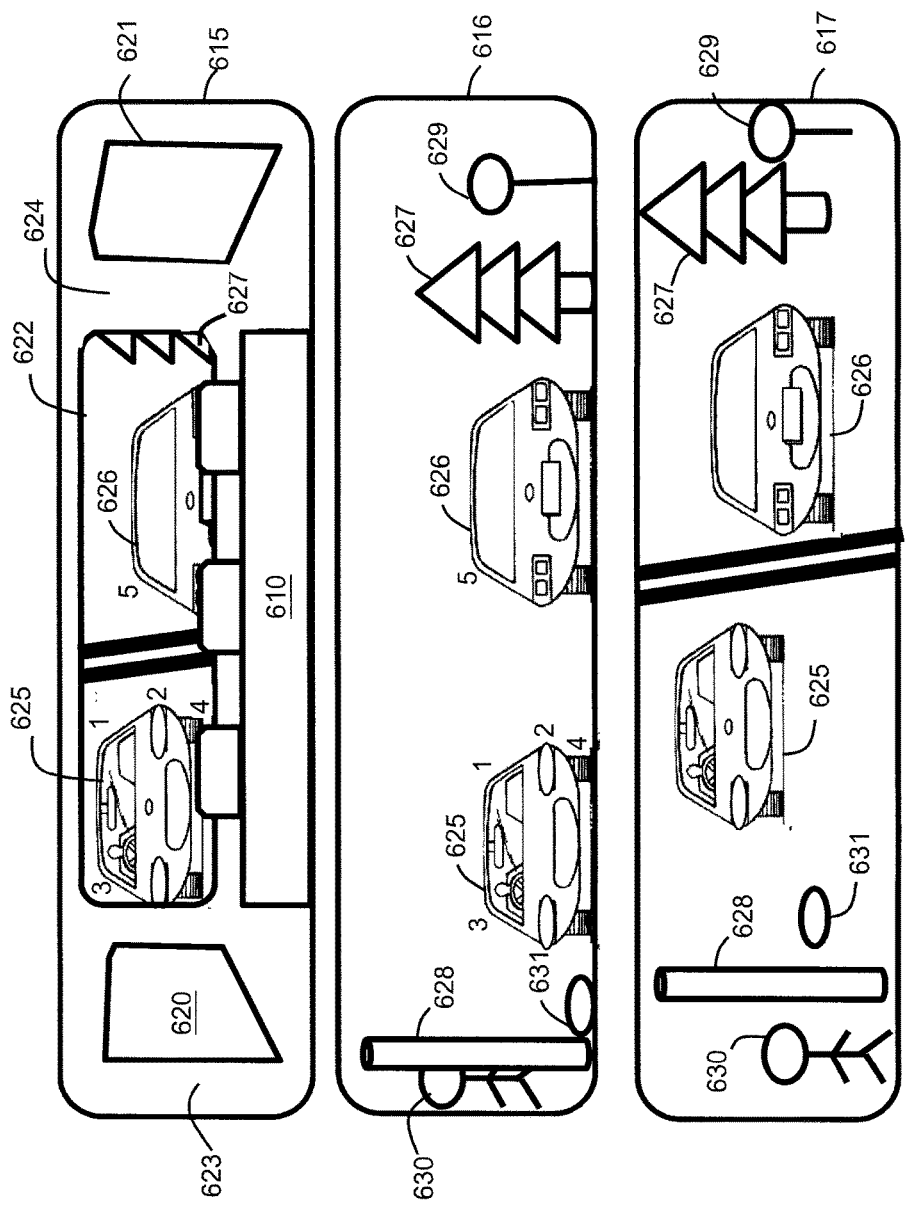
FIG. 5 is a schematic diagram illustrating images before/after image processing in accordance with an embodiment of the present disclosure.

FIG. 5 is a schematic diagram illustrating images before/after image processing in accordance with an embodiment of the present disclosure. An image 615 is captured by the camera 130. An image 616 is captured by the camera 140. A fused image 617 is displayed by the monitor 110. In the image 615, the camera 130 is located above and between a driver seat and a shotgun seat. Therefore, viewing angles of the camera 130 is similar to rear viewing angles of drivers. The image 615 of the camera 130 comprises rear windshields 620, 621, and 622, a rear seat 610, a B pillar 623, a C pillar 624, vehicles 625 and 626, and a tree 627. Since viewing angles of drivers and the camera 130 are similar, the rear viewing angles of drivers are blocked by the rear seat 610, the B pillar 623, and the C pillar 624. Rear situations of the vehicle 100 can only be seen by the rear windshields 620, 621, and 622, which result in lots of blind spots or blind zones. Only parts of the vehicles 625 and 626, and the trees 627 can be seen.

The image 616 is captured by the camera 140, wherein the camera 140 is located on the back of the vehicle 100. Viewing angles of the camera 140 are close to the ground and different from viewing angles of the camera 130. The image 616 of the camera 140 comprises vehicles 625 and 626, a tree 627, a wire pole 628, a traffic signal 629, a pedestrian 630, and an obstacle 631. Comparatively, viewing angles of the camera 130 fail to cover the tree 627, the wire pole 628, the traffic signal 629, the pedestrian 630, and the obstacle 631. If the camera 130 or a rear-view mirror is used alone, the driver may be unaware of the road obstacles or pedestrians around the vehicle 100, resulting in a traffic hazard.

In an embodiment, by using the image processing method 300, the images 615 and 616 are transformed by a most suitable radial distortion homography and then laminated. Later, one of the images 615 and 616 is faded or made into a perspective view. After the above processing, the images 615 and 616 are fused into a fused image 617. Partial steps of the image processing method 300 are described below. According to the steps 410 and 420, the processor 120 detects a plurality of feature points of the images 615 and 616. The feature points of the images 615 and 616 are matched into feature point sets, respectively. The feature point sets, for example, are labeled as numbers 1-5 on both the images 615 and 616. Actually, the numbers of the feature point sets are large, and only a part of the feature point sets is shown herein. According to the steps 430 and 440, by using an iterative algorithm, the processor 120 selects at least five or more feature point sets for every iteration. Further, those feature point sets are repeatedly substituted into the relation formula between the feature point sets and radial distortion homographies. The processor 120 estimates a most suitable or a best radial distortion homography H for the images 615 and 616 and distortion parameters λ and λ' by using the iterative algorithm. The processor 120 stores the most suitable radial distortion homography H. According to the step 320, the processor 120 performs a radial distortion transformation on every pixel of the images 615 and 616, by using the most suitable radial distortion homography H. Further, the processor 120 laminates transformed images into a fused image 617. After the above steps, the processor 120 is able to eliminate image distortions caused by wide-angle lenses so as to obtain the fused image 617 without distortions. In an embodiment, according to the step 330 (transparency step), the processor 120 fades or makes obstruction of sights, such as the rear seat 610, the B pillar 623, and the C pillar 624, into perspective views. That is, the processor 120 performs a transparency step on images of one of the at least two cameras. According to the steps 320 and 330, the processor 120 fuses the perspective views and the transformed images into a fused image 617. The fused image 617 produced by the processor 120 allows the driver to see multiple images simultaneously and have a broader viewing angles. The driver is able to clearly see a variety of obstacles, pedestrians, and other vehicles behind or around the vehicle 100. In addition, there are no image distortions in image stitching regions of the fused image 617. Therefore, blind spots or blind zones caused by the rear seat 610, the B pillar 623, and the C pillar 624 are eliminated.

Figure 6:
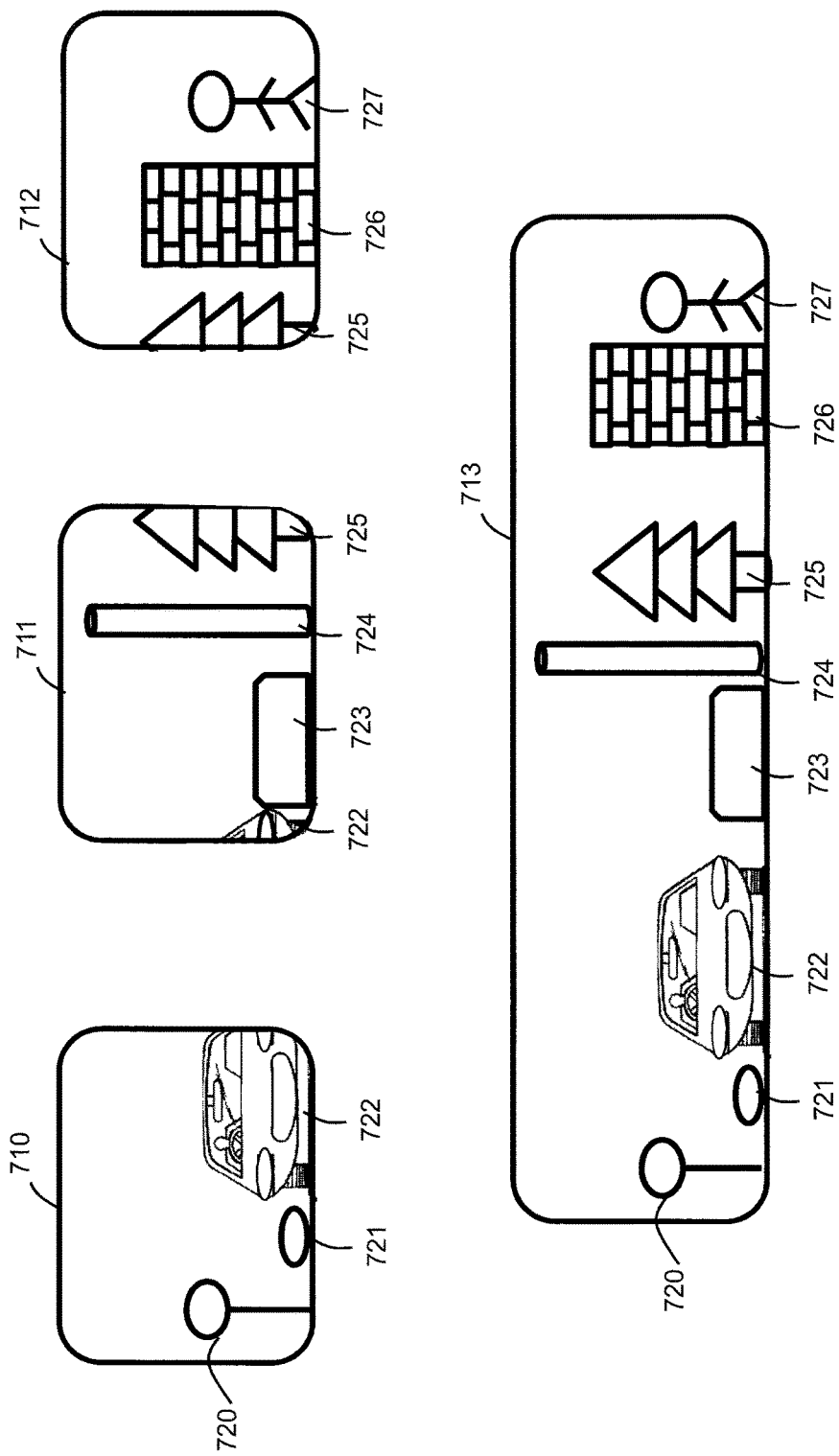
FIG. 6 is a diagram illustrating schematic views before and after image processing in accordance with an embodiment of the present disclosure.

FIG. 6 is a diagram illustrating schematic views before and after image processing in accordance with an embodiment of the present disclosure. In an embodiment, there are three cameras equipped at the back of the vehicle 100. The three cameras respectively retrieve images 710, 711, and 712. The image 710 comprises a traffic sign 720, an obstacle 721, and a vehicle 722. The image 711 comprises the vehicle 722, an obstacle 723, a wire pole 724, and a tree 725. The image 712 comprises the tree 725, a wall 726, and a pedestrian 727. The images 710, 711, and 712 have different viewing angles. By using the image processing method 300, the processor 120 performs a radial distortion transformation and laminates the images 710, 711, and 712. This embodiment of FIG. 6 is different from that of FIG. 5. This embodiment of FIG. 6 omits the step 330 (transparency step) since there are no B/C pillars in the images 710, 711, and 712. Some steps of this embodiment of FIG. 6 are described as follows. According to the steps 430 and 440, by using an iterative algorithm, the processor 120 selects at least five or more feature point sets for every iteration, by using an iterative algorithm. Further, those feature point sets are repeatedly substituted into the relation formula between the feature point sets and radial distortion homographies. The processor 120 calculates a most suitable or a best radial distortion homography H and its distortion parameters λ and λ' for the images 710, 711, and 712. The processor 120 stores the most suitable radial distortion homography H for the images 710, 711, and 712. According to the step 320, the processor 120 performs a radial distortion transformation on every pixel of the images 710, 711, and 712, by using the most suitable radial distortion homography H. Pixels at edges or in image stitching regions of the images 710, 711, and 712 are well coincided. After the above steps, the processor 120 is able to eliminate image distortions caused by wide-angle lenses so as to obtain a fused image 713 without distortions.

In an embodiment, the image processing method 300 is applicable to other transportation vehicles, such as a ship. A tonnage of the ship is huge so that a pilot shall rely on multiple cameras to observe positions of docks. The image processing method 300 transforms every pixel of images of cameras by a radial distortion homography. Pixels at edges or in image stitching regions of the images of cameras are well coincided. There are no image distortions in the image stitching regions. The image distortions caused by wide-angle lenses are eliminated so as to obtain fused images without distortions at any time sequence. Therefore, blind spots or blind zones of the ship are removed.

In an embodiment of the present disclosure, the transparency step (the step 330) of the image processing method 300 removes blind zones or blind spots produced by B/C pillars, rear trunks, and rear half of its vehicle body in rear-view mirrors. In other words, drivers may see through the B/C pillars, the rear trunks, and the rear half of its vehicle body by the image system 200, to avoid traffic hazards. In an embodiment of the present disclosure, the image processing method 300 is used to transform a plurality of images by radial distortion homographies. The transformed images are laminated into a fused image without distortions. In addition, perspective views inside the vehicle are provided, to allow drivers may visually and more easily notice relative distances between the drivers' vehicle and obstacles. In an embodiment of the present disclosure, the image processing method 300 may be regarded as a fusion method for wide-angle images of several cameras. By using a plurality of feature point sets in two images, a most suitable radial distortion homography is estimated. By using the most suitable radial distortion homography and its distortion parameters, a plurality of images captured by the cameras at each of time sequences are fused. Thereby, a generated single fused image may simultaneously cover a plurality of images captured by the cameras. There is no image distortion in image stitching regions of the plurality of images. The image processing method 300 also reduces occurrences of ghost images and improves quality of images after image fusion.

In an embodiment, an image processing method is adapted to process images captured by at least two cameras in an image system. The image processing method comprises: matching two corresponding feature points for two images, respectively, to become a feature point set; selecting at least five most suitable feature point sets, by using an iterative algorithm; calculating a most suitable radial distortion homography between the two images, according to the at least five most suitable feature point sets; and fusing the images captured by the at least two cameras at each of timing sequences, by using the most suitable radial distortion homography.

It will be apparent to those skilled in the art that various modifications and variations can be made to the disclosed embodiments. It is intended that the specification and examples be considered as exemplary embodiments only, with a scope of the disclosure being indicated by the following claims and their equivalents.

| | |
|---|---|
| 100 vehicle | 110 monitor |
| 120 processor | 130 camera |
| 140 camera | 200 image system |
| 300 image processing method | |
| 302, 310, 320, 330, 340, 350, 360 step | |
| 410, 420, 430, 440 step | |
| 510, 520, 530, 540, 550 sub-steps | |
| 610 rear seat | 615 image |
| 616 image | 617 image |
| 620 rear windshields | 621 rear windshields |
| 622 rear windshields | 623 B pillar |
| 624 C pillar | 625 vehicle |
| 626 vehicle | 627 tree |
| 628 wire pole | 629 traffic signal |
| 630 pedestrian | 631 obstacle |
| 710 image | 711 image |
| 712 image | 713 image |
| 720 traffic sign | 721 obstacle |
| 722 vehicle | 723 obstacle |
| 724 wire pole | 725 tree |
| 726 wall | 727 pedestrian |
| H radial distortion homography | $\lambda, \lambda'$ distortion parameter |
| $P_{total}$ totol pixel value | $P_{inside}$ pixel value inside |
| $P_{inside}$ pixel value outside | $W_{inside}$ weight outside |
| $W_{outside}$ weight inside | |

What is claimed is:

1. An image processing method for transportation adapted to process images captured by at least two cameras disposed on one vehicle in an image system, comprising:
    matching two corresponding feature points for two images, respectively, to become a feature point set;
    selecting at least five most suitable feature point sets, by using an iterative algorithm;
    calculating a most suitable radial distortion homography between the two images, according to the at least five most suitable feature point sets; and
    fusing the images captured by the at least two cameras at each of timing sequences, by using the most suitable radial distortion homography;
    wherein before selecting the at least five most suitable feature point sets, randomly selecting at least five feature point sets;
    iteratively calculating a plurality of radial distortion homographies before calculating the most suitable radial distortion homography between the two images; and quantitatively assessing the plurality of radial distortion homographies;

wherein after iteratively calculating each of the plurality of radial distortion homographies for every iteration, the image processing method further comprises:

marking a ground truth point set between the two images;

transforming the ground truth point set into a transfer point set, respectively, according to each of the plurality of radial distortion homographies; and calculating a distance difference value between the transfer point set and the ground truth point set.

2. The image processing method according to claim 1, wherein before matching the two corresponding feature points for the two images, respectively, to become the feature point set, the image processing method further comprises:

detecting a plurality of feature points of the two images.

3. The image processing method according to claim 1, wherein after fusing the images captured by the at least two cameras at each of the timing sequences, by using the most suitable radial distortion homography, the image processing method further comprises:

storing the most suitable radial distortion homography.

4. The image processing method according to claim 1, further comprising:

performing a transparency step on images of one of the at least two cameras; and fusing the images performed by the transparency step at each of the timing sequences.

5. The image system according to claim 1, wherein the processor is configured to fuse the images of the at least two cameras, by using the most suitable radial distortion homography.

6. The image system according to claim 5, wherein the processor is configured to eliminate sight obstructions between the images captured by the at least two cameras.

7. An image system for transportation, the image system comprising:

at least two cameras disposed on one vehicle and configured to capture images;

a processor coupled to the at least two cameras, wherein the processor is configured to eliminate distortions of the at least two cameras so as to obtain fused images without distortions; and a monitor coupled to the processor, wherein the monitor is configured to display the fused images without distortions;

wherein the processor is further configured to calculate a most suitable radial distortion homography, by using an iterative algorithm;

wherein the processor is further configured to iteratively calculate a plurality of radial distortion homographies before calculating the most suitable radial distortion homography between the two images and to quantitatively assess the plurality of radial distortion homographies;

wherein after iteratively calculating each of the plurality of radial distortion homographies for every iteration, the processor is further configured to:

mark a ground truth point set between the two images;

transform the ground truth point set into a transfer point set, respectively, according to each of the plurality of radial distortion homographies; and calculate a distance difference value between the transfer point set and the ground truth point set.

* * * * *